Feb. 2, 1960 E. H. BRANDENBURG 2,923,865
MAGNETIC HOLDING DEVICES
Filed Aug. 20, 1953 6 Sheets-Sheet 1
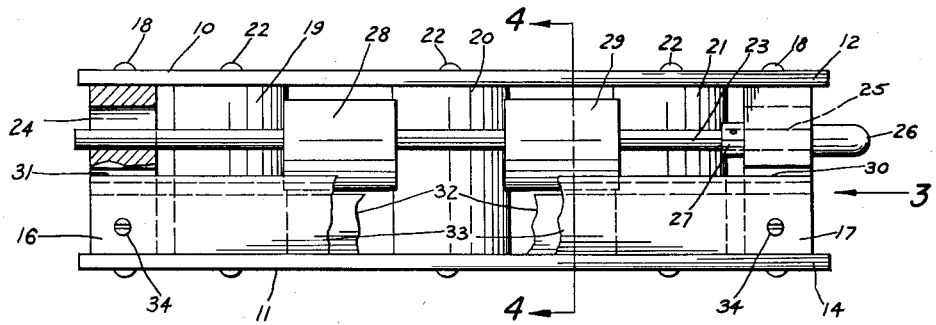
Fig. 1
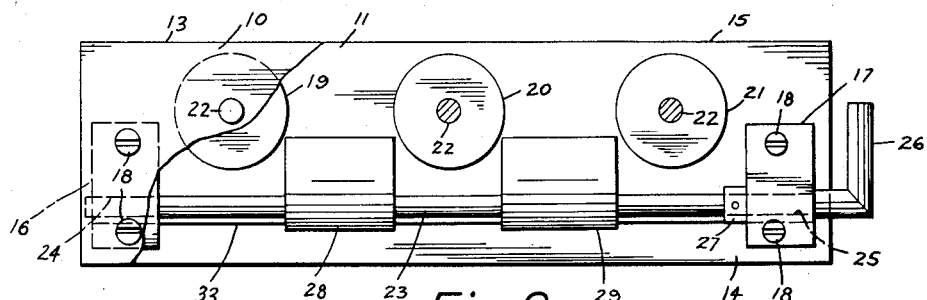
Fig. 2
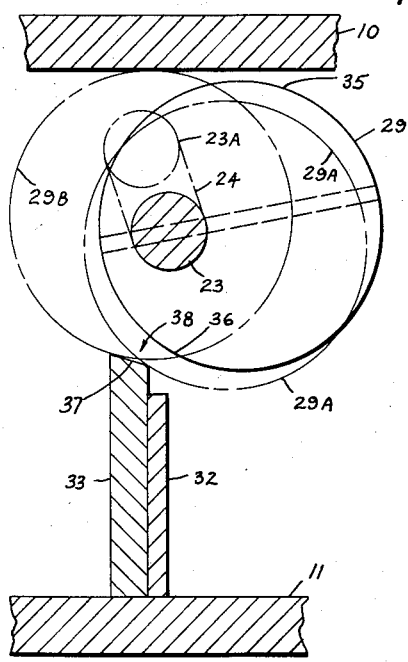
Fig. 5
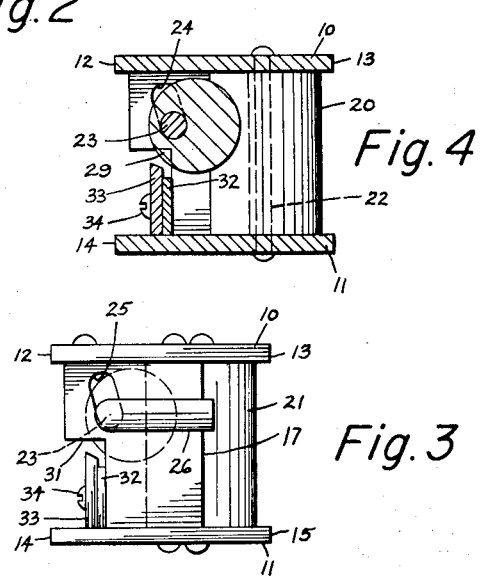
Fig. 4
Fig. 3
INVENTOR.
EDWIN H. BRANDENBURG Feb. 2, 1960    E. H. BRANDENBURG    2,923,865
MAGNETIC HOLDING DEVICES
Filed Aug. 20, 1953    6 Sheets-Sheet 2
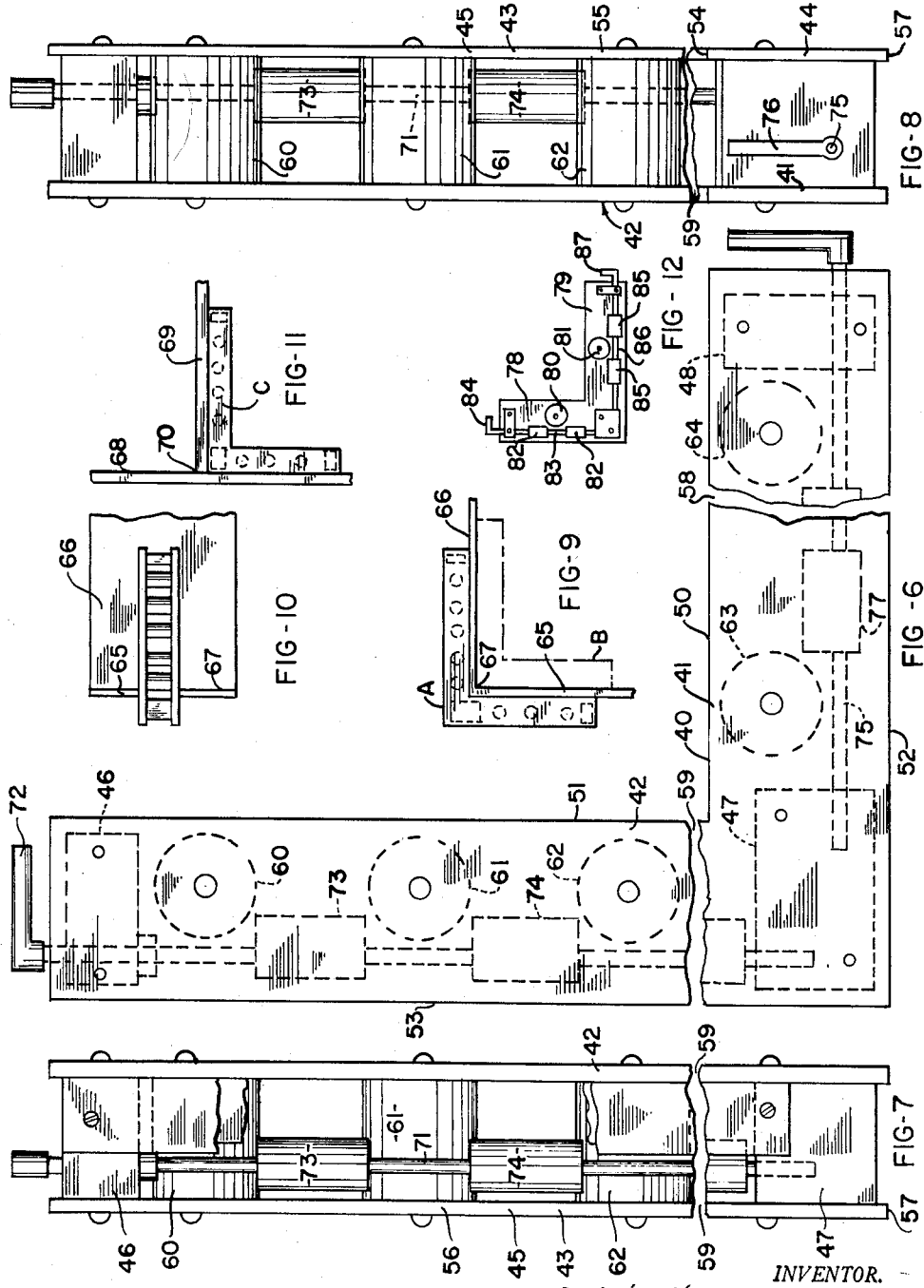
INVENTOR.
Edwin H. Brandenburg
BY Harry P. Canfield
Attorney INVENTOR.
Edwin H. Brandenburg
BY Harry R. Canfield
Attorney

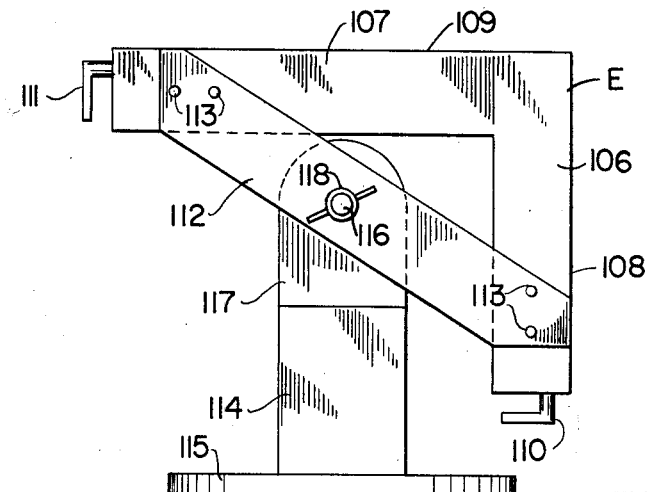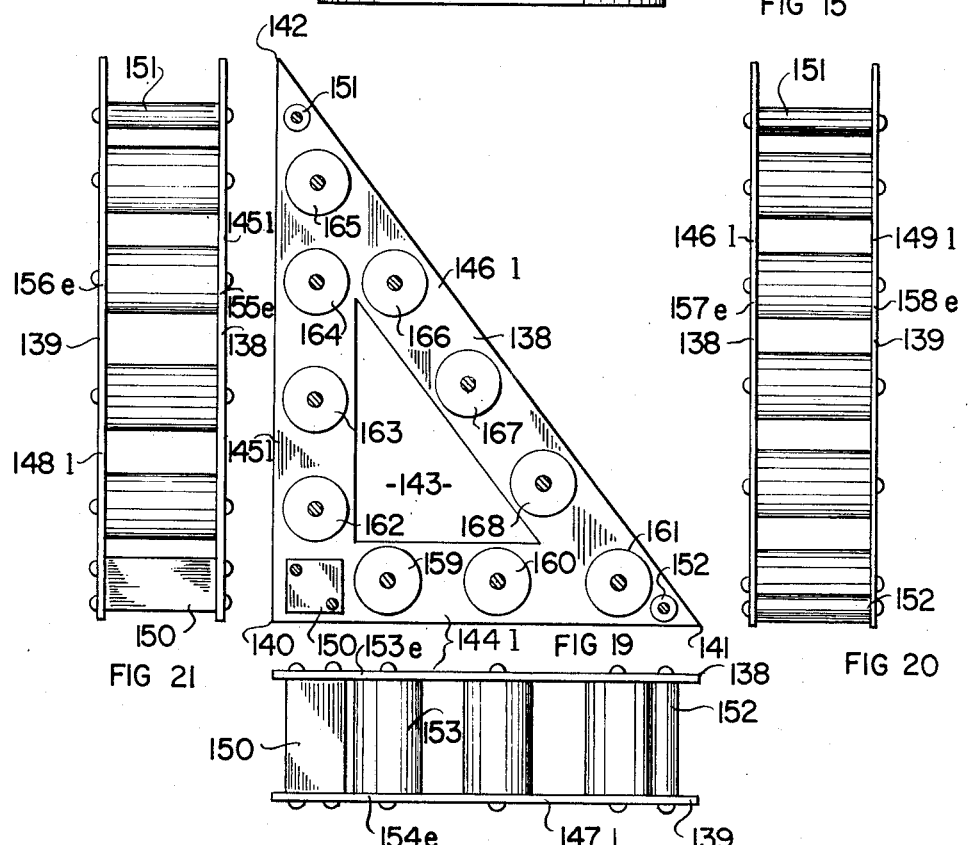

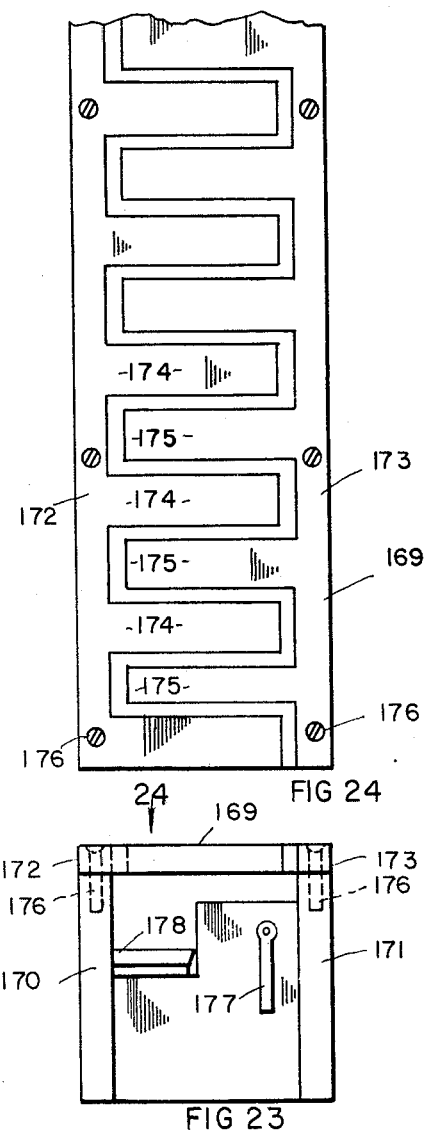

United States Patent Office 2,923,865
Patented Feb. 2, 1960

2,923,865

MAGNETIC HOLDING DEVICES

Edwin H. Brandenburg, Lakewood, Ohio

Application August 20, 1953, Serial No. 375,415

2 Claims. (Cl. 317—159)

This invention relates to devices of the class in which permanent magnets energize pole pieces to cause them to grip ferrous objects; or to cause them to grip a ferrous support for the device itself.

The invention comprises particularly an improved magnetic circuit for the magnet, by means of which a plurality of magnets may energize the pole pieces, each with its own independent magnetic circuit; and comprises mechanisms which may be optionally utilized, to operatively short-circuit each of the magnets independently but all in unison.

The underlying principle of the invention is embodied, in its simplest form, in a pair of rectangular, elongated, planar pole pieces, held parallel and spaced apart, with a longitudinal series of magnets therebetween, and the longitudinal edges of the pole pieces provide a pair of parallel gripping edges that are rectilinear, the pair of edges being in a common plane.

When used to grip ferrous objects, the rectilinear edges of this simple embodiment have the properties of a geometrical instrument of the "straight edge" or "parallel edge" type, and can be used to position or align objects rectilinearly, relative to each other, or parallel to a support surface.

The geometrical instrument properties of the invention may be embodied in other forms which have more than one pair of gripping edges and the pairs disposed so that, in positioning ferrous objects relative to each other or relative to a support, the device, in such several embodiments, performs functions of the well known "carpenter's square," or of a T-square, or of a triangle.

The invention is useful in a number of arts. It is shown and described herein in a number of embodiments in the general class of jigs or fixtures for holding ferrous work pieces in desired positions while being worked upon, or assembled together; but as will appear hereinafter, embodiments for other uses are shown and described; and the invention is not limited to particular uses.

The actual invention is that set forth in the appended claims.

Generally speaking however, the invention comprises, as implied in the foregoing, opposite planar spaced apart, elongated, pole pieces, having rectilinear gripping edges, energized by a magnet or series of magnets between the pole pieces; and the pole pieces may be formed so that the gripping edges are rectilinear in one direction only; or the pole pieces may comprise legs extending in different directions providing gripping edges on the respective legs at an angle to each other; or the angularly related legs may be part of a structure that mounts them upon a base so that the angularly related gripping edges may be adjusted in unison into different angular positions relative to the base; or two pairs of pole pieces, each with a pair of gripping edges in one rectilinear direction only may be part of a structure that disposes the gripping edges in rectilinear alignment, or optionally at an angle, but spaced apart at adjacent ends, providing a clear three dimensional working space therebetween for working work pieces gripped on the edges; or the pole pieces may have gripping edges for gripping a ferrous support, and other gripping edges for gripping ferrous articles; or the pole pieces may have gripping edges for gripping a support, and may have a non-magnetic mounting device secured to the pole pieces to mechanically mount another kind of object and position it relative to the support; or the pole pieces whether having legs or not, may have two pairs of gripping edges on opposite sides of the magnets, for various uses.

The invention also comprises means by which a mechanism as referred to, for short circuiting the magnets to release their grip at the gripping edges, may be assembled in the various embodiments of the invention at the time they are made, or may be omitted if not wanted at that time, and assembled later; whereby the various embodiments and the mechanisms may be made and stocked separately, effecting well known economy.

The grip releasing mechanism comprises, generally, a rotary ferrous body, for example a cylinder or disc eccentrically supported, and rotatable by an operator, and disposed between the said pair of pole pieces, and adjacent to the side of the magnet; and rotatable to a position in which it provides a closed magnetic path between the pair of pole pieces and thereby short circuits the flux of the magnet.

When a series of magnets is provided in the device as aforesaid, the device may comprise a corresponding series of such rotary short-circuiting bodies, one for each magnet, all mounted to be rotatable in unison to short circuit each magnet independently.

The invention comprehends devices having only one magnet, particularly when the grip releasing feature is incorporated in the device.

The objects of the invention are to provide an improved magnetic holding device which may be constructed to have among other features the improvements of construction and the improved modes of operation referred to in the foregoing.

Other objects will occur to those skilled in the art to which the invention appertains.

The invention is fully disclosed, in a number of embodiments thereof, in the following description taken in connection with the accompanying drawing in which:

Figs. 1 to 5 illustrate one embodiment of the invention, of which:

Fig. 1 is a top plan view with parts broken away and parts in section;

Fig. 2 is a front elevational view with a part of the front broken away;

Fig. 3 is an end elevational view taken in the direction of the arrow 3 of Fig. 1;

Fig. 4 is a sectional view taken from the plane 4—4 of Fig. 1;

Fig. 5 is a view somewhat diagrammatic, of a part of Fig. 4, to enlarged scale; illustrating the operation of mechanism parts of Figs. 1 to 4;

Figs. 6 to 12 illustrate another embodiment of the invention, of which, Fig. 6 is a front elevational view;

Figs. 7 and 8 are side elevational views from the left side and right side, respectively of Fig. 6;

Figs. 9 and 10 are respectively side elevational and top plan views illustrating a use of the embodiment of Figs. 6 to 8;

Fig. 11 is a view similar to Fig. 9 illustrating another use;

Fig. 12 is a small scale view corresponding to Fig. 6 with a front part removed, and showing the embodiment of Fig. 6 in simplified form;

Fig. 15 is a front elevational view of the embodiment of Figs. 6 to 12 as applied to a structure for particular uses;

Figs. 16 to 18 are views illustrating the embodiment of Figs. 1 to 5 as applied to a structure for a particular use; of which:

Fig. 16 is a front elevational view with parts broken away and in section;

Fig. 17 is a top plan view of the parts of Fig. 16;

Fig. 18 is an end elevational view of the parts of Fig. 16;

Figs. 19 to 22 are views of another embodiment of the invention of which:

Fig. 19 is a front elevational view;

Figs. 20 and 21 are respectively elevational views from the right side and left side of Fig. 19;

Fig. 22 is a bottom plan view of the parts of Fig. 19;

Figs. 23 and 24 are views of the embodiment of Figs. 1 to 5 with a structural part added, of which Fig. 23 is an end elevational view, corresponding to Fig. 3; and Fig. 24 is a top plan view taken in the direction of the arrow 24 of Fig. 23.

Figure 13:
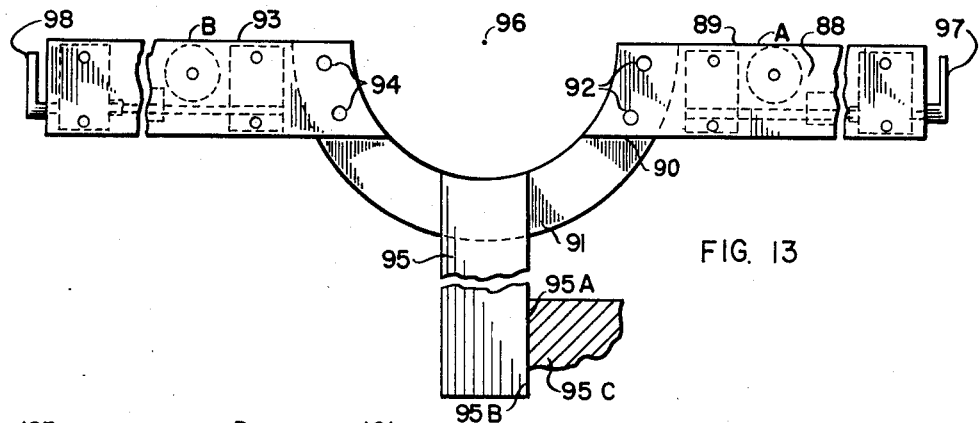
Fig. 13 is a front elevational view illustrating the embodiment of Figs. 1 to 5 as applied to a structure for particular uses.

In Figs. 1 to 4 the invention is illustrated in a simple form.

At 10 and 11 is a pair of rectangular, planar, plate-like pole pieces, having respectively rectilinear edges, 12—13 and 14—15. The pair of edges 12—14 are in a common plane, and similarly the edges 13—15 are in a common plane.

The pole pieces 10—11 are rigidly positioned relatively in spaced apart relation by spacer blocks 16 and 17 of non-magnetic material such as brass or aluminum for example, riveted to and between the pole pieces by rivets 18—18.

Three permanent magnets, preferably cast alloy magnets, and preferably cylindrical in form, are shown at 19—20—21. They are magnetized in the direction of the cylinder axis and have their ends, of opposite polarity, squared off and fitted between the pole pieces 10—11 and secured thereto by non-magnetic rivets 22 extending through the pole pieces and through axial bores in the magnets, as best shown in Fig. 4, which bores may be formed in the magnets when cast.

The pole pieces 10—11 are shown of a length to accommodate three magnets, spaced apart laterally, but the pole pieces may be of greater lengths to accommodate greater pluralities of magnets.

Each magnet has its own independent magnetic circuit, and energizes a portion of the edges of the pole pieces, the circuit being from one end of the magnet through a pole piece to the pole piece edge, thence through the air to the other pole piece edge, and through said other pole piece to the other end of the magnet.

In the use of this simple form, it may for example be placed with the edges 12—14 on a ferrous support and the device as a whole firmly gripped thereon and supported rigidly thereby; and ferrous objects may then be placed on the edges 13—15, spanning them and gripped and positioned and supported thereby for any purpose; or the device as a whole may be supported by one pair of edges on a non-ferrous support and only the other pair of edges used to grip ferrous objects.

The pairs of edges 12—14 and 13—15 are preferably parallel with each other and the device therefore may perform the functions of a "straight edge" or "parallel edge" geometrical instrument.

By dividing up the working magnetic flux among a number of magnets of small cross section, each energizing a portion of the gripping edges, they energize the edge more uniformly over their length than if a single magnet of large cross section were employed, as heretofore in other construction of holding devices; and the total of the expensive magnet alloy for a given total holding or gripping force, is less than if a single magnet were utilized; particularly in cases in which the pole pieces are of great length and a corresponding single magnet would be of great cross section, because of the tendency of the flux in a large cross-section magnet to be partially short circuited in the magnet itself.

Thus economy of costly material and improved operation are effected by the foregoing construction.

In some cases it is desirable to prevent the pole piece edges from gripping, until after the device is positioned on a ferrous support, or until after objects are positioned on its edges; and, conversely, desirable to release the gripping action to facilitate the removal of the device from a gripped ferrous support, or the removal of gripped objects from the edges.

This is done in the form of Figs. 1 to 4 by manual means operable to short circuit the flux path of each magnet independently, as follows.

A rotary shaft 23 preferably of non-magnetic material, is mounted at opposite end portions in bearing bores 24—25 in the end blocks 16—17; and is rotatable by an external handle 26 thereon; the handle and a collar 27 on the shaft at opposite ends of the bearing bore 25 preventing endwise shifting of the shaft. The shaft is disposed at the sides of the magnets as shown.

Cylindrical bodies of ferrous material, 28—29 are mounted eccentrically on the shaft to rotate therewith, the body 28 being generally between and adjacent to the sides of the magnets 19 and 20, and the body 29 similarly located with respect to the magnets 20 and 21.

Rectangular notches 30—31 are provided in the end blocks 16—17. A strip 32 of non-magnetic material, and a bar 33 of ferrous material extending from one block to the other are mounted at their ends in the said notches by screws 34—34. The strip 32 and bar 33 extend along the sides of the magnets, as indicated in Figs. 1 and 4, with the non-magnetic strip between the ferrous bar and the magnets to keep them separated.

The strip and bar are not shown in Fig. 2. If shown they would be almost directly under the shaft 23 and would confuse the showing and for this reason have been omitted from this figure.

The assembly of these parts in the device is shown in Figs. 1 to 4, and a description of the operation thereof in the device follows, but it will be better understood by concurrently referring to Fig. 5 which corresponds to a part of Fig. 4.

When the shaft 23 is in the position of Figs. 1 to 4 determined by a corresponding position of the handle 26, the cylindrical body 29 will be in the solid line position, 29, of Fig. 5. A portion of its peripheral surface will be in contact with or somewhat spaced from the pole piece 10, as at 35, as shown. The diametrically opposite portion of its peripheral surface, for example at 36, will be spaced from the adjacent edge 37 of the bar 33, thus providing an air gap 38.

Upon rotating the shaft 23 by the handle 26 in the clockwise direction as viewed in Figs. 3-4-5, the surface of the body 29 will first take up the broken line position indicated at 29A Fig. 5 and it will engage the edge 37 of the bar 33, as shown.

Further rotation of the shaft 23 will cause the surface of the body 29 to slide on the edge 37 and exert a camming action thereon, due to the eccentricity described.

The camming action will put side thrust on the shaft 23. The bearing bores 24 and 25 for the shaft are elongated transversely into slot form as shown at 24 Figs. 1-3-4-5.

The said side thrust on the shaft, as the body 29 continues to rotate and exert camming action, will move the shaft from one side of the slot form bearing bore, where it is shown in solid line Fig. 5, toward the other side of the bore and toward a broken line position 23A; and the rotating eccentric body 29 will move with the shaft and take up the position indicated at 29B, in which position it engages both the edge 37 of the bar 33 and the pole piece 10; and further clockwise torque on the shaft 23 and further camming action will make this engagement a wedging pressure engagement, and stop further rotation of the shaft.

Flux from the magnet 20 now has a ferrous path from the pole piece 10 through the body 29 and bar 33, to the pole piece 11, and this being a wholly ferrous path is a direct short circuit for the flux; and flux which would otherwise go to the pole piece edges, is diverted from doing so.

Upon turning the shaft 23 in the counter clockwise direction, the opposite movement of the body 29 occurs as will be understood; and the body introduces the air gap at 38, or partly at 38 and partly at the point 35, and the short circuit path is thereby destroyed.

The body 29 having a cylindrical surface and engaging the rectilinear edge 37 and the pole piece 10 on surfaces parallel to its axis, large contact area is provided for effecting the magnetic short-circuit.

The shaft 23 is free to float in the elongated bearing bores 24 and 25, but no matter what position it may occupy when the shaft is in its counter clockwise position, the same total air gap will be present, and when rotated clockwise all of the air gap will be taken up and replaced by ferrous parts wedgingly engaged, as will now be clear.

From the foregoing it will be seen that the body 29 will short-circuit the magnets 20 and 21; and the body 28 at the same time will short circuit the magnet 19 and 20; each magnet having its own independent short circuit.

It will also be apparent that the device of Figs. 1 to 4 may be put to practical uses, without the grip releasing feature, or with it, as desired; and that the device can be manufactured in a standard construction with the end blocks 16 and 17 as shown and described and stocked as such; and the grip releasing parts may be made and separately stocked and added later when wanted.

Figs. 6–7–8 illustrate another form of the invention; the description of which will be simplified in view of the complete description of the form of Figs. 1 to 4.

As viewed in Fig. 6, the device comprises an L-shaped front pole piece 40 (toward the observer) comprising a horizontal leg 41 and a vertical leg 42; and behind it is a like L-shaped pole piece 43 comprising horizontal and vertical legs 44 and 45.

The legs 40—41 of the front pole piece 40 are integral and generally at right angles to each other and in the general form of a "carpenter's square," as shown; as are also the legs 44—45 of the rear pole piece 43.

The front and rear pole pieces 40—43 are preferably planar and are secured to each other in spaced apart generally parallel relation by non-magnetic spacer blocks 46, 47 and 48, riveted thereto.

The front legs 41 and 42 have respectively interior gripping edges at 50—51 and exterior gripping edges at 52—53. The rear legs 44—45 have interior gripping edges at 54—55 and exterior gripping edges at 56—57.

These said edges are accurately rectilinear, and, regardless of any deviation from the right angle relation to each other, of the front legs 41—42 and of the rear legs 44—45, the edges are disposed so that two planes at a dihedral angle of 90° will accurately coincide with all four interior edges 50—51—54—55; and two planes at a dihedral angle of 90° will accurately coincide with all four exterior edges 52—53—56—57.

The horizontal legs 41—44 and the vertical legs 42—45 may be of any desired length, as is indicated in the drawing by the broken out parts at 58—59, to reduce the size of the drawing.

A plurality of magnets (only three being shown) at 60 to 62 are fitted at their polar ends between the vertical legs 42—45; and a plurality of magnets (two only being shown) at 63—64 are fitted at their polar ends between the horizontal legs 41—44.

The magnets each have an independent magnetic circuit as described for Figs. 1 to 4, including in each case, a portion of the front and rear, interior edges or a portion of the front and rear exterior edges.

One particularly useful application for a holding device of this construction, is illustrated in Figs. 9 and 10.

Two pieces of metal 65—66 which may for example be two walls of a sheet metal box which are to be welded together at 67, at a dihedral angle of 90°, are placed respectively on the said interior edges of the device, the latter being shown generally at A, and with the two pieces abutting; and they will be accurately positioned at the said dihedral angle and also rigidly gripped and held in that position, while being welded together.

If preferred, the pieces may be placed on the said exterior edges of the device with the same result, as indicated in Fig. 9, the device in such case being shown generally in broken lines at B.

In Fig. 11 is illustrated a similar use of the device when two metal pieces 68—69 are to be welded together at a T juncture 70, the pieces being put on the exterior edges of the device, shown generally at C.

As is clearly evident in Figs. 9 to 11, the device has the geometrical instrument property of a carpenter's square.

The grip releasing mechanism described in detail for Figs. 1 to 6 may, when wanted, be applied to the device of Figs. 6 to 8, wherein it is illustrated in a simplified manner to avoid drawing complications. The parts, functions, and mode of operation, will be understood upon comparing them with corresponding parts of Figs. 1 to 6, and a briefer description than otherwise will suffice; only such parts being shown as are necessary to identify them with corresponding parts of Figs. 1 to 6.

A shaft 71 is rotatably supported at its ends in the spacer blocks 46—47, between the vertical legs 42—45, rotatable by a handle 72, and carries cylindrical bodies, two being shown at 73—74, for short circuiting the magnets 60 to 62.

A shaft 75 is rotatably supported at its ends in the spacer blocks 47—48, between the horizontal legs 41—44, rotatable by a handle 76, and carries cylindrical bodies, one being shown at 77, for short circuiting the magnets 63—64.

As stated, the legs of the device may be of any desired length, and have a corresponding number of magnets, and a corresponding number of short-circuiting parts as will be understood, will be provided for all of the magnets.

It is to be noted that the horizontal and vertical legs of this device, Figs. 6 to 8, may be short and be provided each with only one magnet and corresponding short-circuiting parts therefor when wanted.

Such a modification is illustrated in Fig. 12 which may be considered as a view similar to Fig. 6 but with the front legs removed.

Vertical and horizontal legs 78—79 have their edges energized to grip, by two magnets, 80—81, respectively, and the grip releasing feature is provided (operating as described for Figs. 1 to 6), by a pair of bodies 82—82 on a shaft 83 operated by a handle 84 to short-circuit the magnet 80; and by a pair of bodies 85—85 on a shaft 86 operated by a handle 87, to short circuit the magnet 81.

Figure 14:
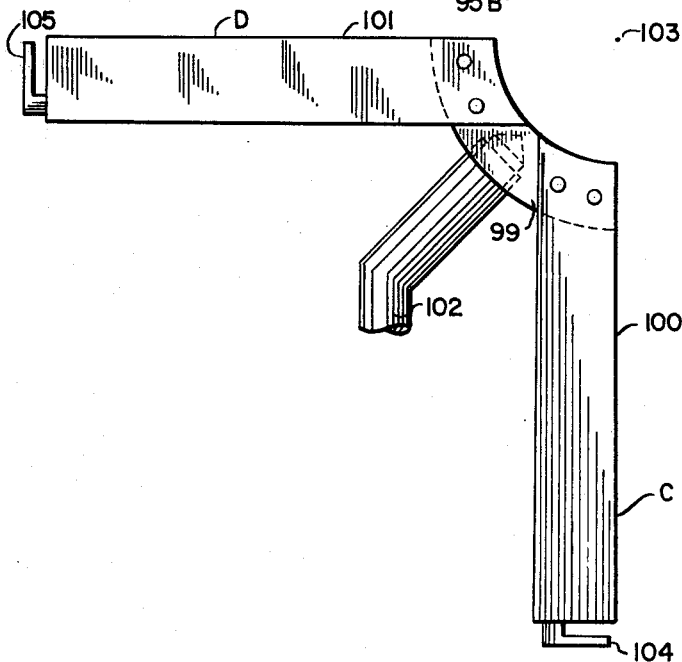
Fig. 14 is a view similar to Fig. 13 but with respect to a different use.

In Figs. 13 and 14 are illustrated forms of the invention for gripping a plurality of articles and holding them in desired positions when being worked upon, for example, when butt welding two pieces together; and the structure provides a clear, open three dimensional space at the zone of working.

In Fig. 13 at A is a gripping device, which may be constructed like the device of Figs. 1 to 5. To save drawing complications it is shown only in side elevation corresponding to Fig. 2. One of the two pole pieces, 88, is toward the observer and has a gripping edge 89.

The other gripping edge is parallel to the edge 89 and in a horizontal common plane with it as will be understood, and 89 therefore indicates the common plane.

The left end of the pole pieces are extended as at 90 and a depending arcuate bridge 91, of non-magnetic metal, is riveted to them at 92.

At B is a duplicate of the device A turned end-for-end having two pole pieces with edges, one edge being indicated at 93, and both edges in the plane 89. The other end of the bridge 91 is riveted to the pole pieces of the device B at 94. The bridge holds the devices A and B rigidly in their said positions.

The bridge 91 comprises a post 95 by which the two devices A and B may be supported.

Pieces to be butt welded, for example, two sheets, or two bars, are placed, respectively on the gripping edges of the two devices A and B with their abutting portions midway between the two devices and thereby are aligned in and held in a common plane; and if the pieces are rectilinear bars, bridging the edges of the devices, they are aligned and held coaxially.

The arcuate bridge 91 has a large radius. This disposes the confronting ends of the devices A and B far apart and disposes the bridge itself far below the gripping plane. The gripped articles can be positioned to about at the point 96 on said plane, and remote from the devices and from the bridge; so that when, for example, the work operation on the pieces is welding, there is an ample, three-dimensional space around the point of working; so that neither the devices themselves, nor the bridge (which being of non-magnetic metal may be a soft metal such as brass) will be liable to damage by the welding arc of flame.

The post 95 may be provided with a planar surface or edge on either side thereof, for example at 95A, at right angles to the planes identified as aforesaid at 89 and 93; and the edge or surface 95A may be placed in coincidence with an edge or surface 95B of a stationary base 95C. In such case the planes 89—93 will be positioned at a right angle to the surface 95B and the device as a whole has the geometrical instrument property of a T square.

The releasing mechanism of Figs. 1 to 6 may be applied to the devices A and B, and it is believed that the parts are sufficiently identified by the dotted line showing in the devices and by the operating handles indicated at 97 and 98, so as not to require further description.

In Fig. 14, two devices C and D like the devices A and B of Fig. 13 are provided rigidly connected to a bridge 99 similar to the connection to the bridge 91 of Fig. 13, except that the devices C and D are disposed so that the planes of their gripping edges (indicated at 100—101) are at a dihedral angle, for example, 90°.

A post 102 connected to the bridge 99 provides a support for the devices.

Articles gripped by the device edges will meet or abut at a point 103 at a right angle to each other for being connected together for example by welding; and as in Fig. 13, and for like structural reasons, and with the same advantages the working point is remote from the devices and from the bridge.

Obviously the devices C and D may be disposed at angles other than 90°.

The grip releasing mechanism can be used with the device of Fig. 14, and description of it is deemed unnecessary, in view of the foregoing. It is identified as being a part of the device by the showing of the operating handles thereof at 104 and 105.

As will be apparent the structure of Fig. 14 has the geometrical instrument property of a right angle triangle or of a carpenter's square.

The "carpenter square" form of the device of Figs. 6 to 12 is shown therein as supported by the articles which it grips and positions. It is sometimes desirable to support the device independently of the articles, and to be able to adjust its position. A form for this purpose is shown in Fig. 15.

The gripping device is here shown in outline only at E, comprising two legs 106—107, having gripping edges in common planes indicated at 108—109, it being deemed unnecessary to describe it further in view of the foregoing.

The aforesaid grip release mechanisms are applicable to it as in Figs. 6 to 12 and are identified by the operating handles thereof at 110—111.

A diagonal bridging bar 112, of non-magnetic metal, is secured to the legs 106—107 of the device at points adjacent to their free ends, for example by rivets 113.

A supporting post 114 held upright by a base 115, has a threaded bolt 116 extending laterally from a flat face 117 on the upper portion of the post, and it projects through a corresponding hole in the intermediate portion of the bridging bar; and a wing nut 118 is screwed on the bolt, to clamp the bar against the post.

The whole device E may be rocked to different positions around the bolt 116 and clamped in such positions to dispose the article gripping planes 106—107 in various angular positions with respect to the base 115 to facilitate the uses thereof.

Figure 17:
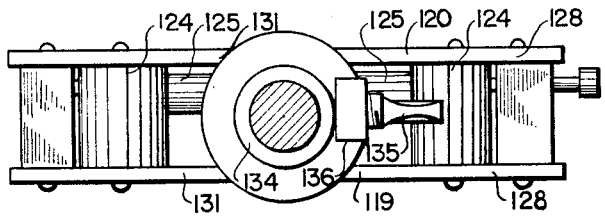
Figures 16, 18:
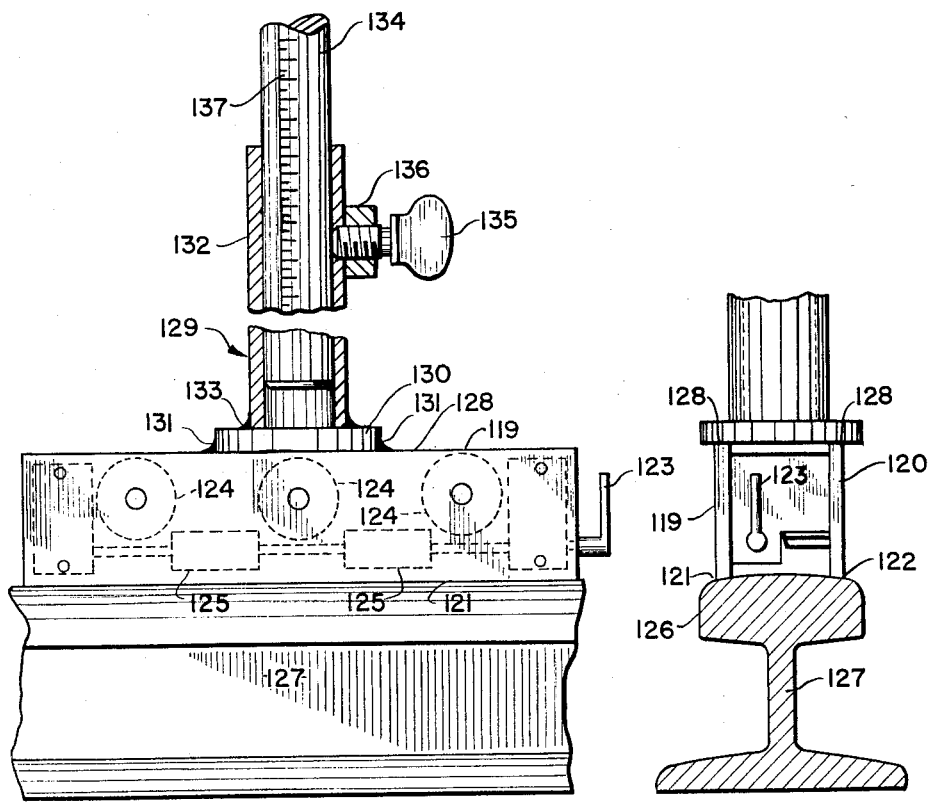

In Figs. 16, 17 and 18 is illustrated a device embodying the invention in a form that is particularly useful and advantageous in the laying of railway rails.

The surveyor, in the usual prior practice, must set up a levelling telescope on the ground, at a first point where the rail has been laid and determine the height of the telescope line of sight from the top of the rail at that first point. He can then sight the telescope on a target at a second distant point and thereby determine the correct calculated height or level for the rail at that distant point with respect to that at the first point.

It is difficult to find accurately, the said height of the line of sight from the top of the rail at the first point.

The invention in the form of Figs. 16, 17 and 18 comprises a device such as illustrated in Figs. 1, 2 and 3, respectively, and preferably comprising the grip releasing feature shown in those figures.

The structure is identified with that of Figs. 1, 2 and 3 by showing the pole pieces at 119—120, with rectilinear gripping edges 121—122, the grip releasing handle 123, magnets 124, and magnet short-circuiting bodies 125; and it is deemed unnecessary to further illustrate or describe it.

The pole pieces 119—120 are spaced apart a suitable distance to cause the gripping edges 121—122 to be spanned by the top flange 126 of a railroad rail 127.

On the top edges 128—128 of the pole pieces is attached an instrument mounting device 129, comprising a disc-like base 130 of non-magnetic material bridging said edges and secured thereto by welding for example as at 131—131; and having a tube 132, welded to the base as at 133. The tube is sized to receive a standard 134 of a telescope or other instrument, and for vertical sliding adjustment thereof in the tube; the adjusted positions being fixed by a thumbscrew 135 threaded into a nut 136 welded to the outside of the tube.

In view of the use of this device mentioned above it will be apparent that when it is gripped on a rail as illustrated, the surveyor can readily determine the height of the line of sight from the top of the rail; and to this end a scale 137 may be provided on the standard 134, and calibrated so that the top of the tube 132 indicates the said height on the scale.

The forms of the invention, of Figs. 6 to 12 and 15, and the forms of Figs. 13 and 14, show that the invention may be embodied in structures having properties of geometrical instruments.

This is further shown by Figs. 19 to 22, where the device is in the form of a triangle, having pairs of gripping edges at angles of 90, 60 and 30 degrees.

In Figs. 19 to 22, the pole pieces are exteriorly of triangle form. The corners 140—141—142 may be at any desired angle, but have been shown as 90°, 60° and 30° respectively.

A triangular center hole 143 is provided and this makes the pole pieces each in the form of three integral legs, 144—145—146 for the pole piece 139.

The pole pieces 138—139 are spaced apart by non-magnetic spacers 150—151—152 riveted to and between the pole pieces.

The spaced apart pairs of legs as thus provided have corresponding pairs of rectilinear gripping edges, each pair of edges being in a common plane; and in this device it is preferred that the three lines at which the three common planes intersect shall be parallel lines.

The pairs of gripping edges of the legs are, as shown, edges 153—154 for the legs 144—147; edges 155—156 for the legs 145—148; edges 157—158 for the legs 146—149.

Magnets are fitted between and riveted to the legs as hereinbefore described, to energize the said edges; magnets 158 to 160 for the edges 153—154; magnets 162 to 165 for the edges 155—156; and magnets 165 to 168 and 161 for the edges 157—158.

In use, the device may be gripped upon the surface of a ferrous support say the plane surface of a tool maker's surface block, by any pair of the edges and the other two pairs of edges provide common planes, respectively, for disposing magnetic or non-magnetic articles at respective angles with respect to the surface of the block; or any two pairs of edges at their included angle may be used to grip two ferrous articles and position them relatively at said angle.

Various other uses will occur to those skilled in the art.

The grip releasing mechanism has not been shown in this form but it is believed that it will be clear how one skilled in the art may add it from the foregoing descriptions thereof herein.

The center hole 143 may be omitted but it is preferred, since its presence introduces a high reluctance path between the interior edges of the legs to cause the magnet flux to flow to the exterior edges when a ferrous body is placed thereon.

In all of the above described embodiments of the invention, a pair of planar pole pieces is shown supplied with magnet flux from the ends of magnets between them, and rectilinear edges of the pole pieces provide a pair of rectilinear edge surfaces energized by the flux to grip a load or work spanning the pair of edges.

This provides the simplest construction of invention embodiment.

In some cases, however, the load or work piece to be gripped may be too small to span the pair of edges; or may have a single rib which it is desired to grip while extending longitudinally of the elongated device.

For such cases a form of pole piece, such as shown in Figs. 23 and 24 is preferred.

Fig. 23 will be seen to be an end view of a device like Fig. 3 with the addition of a bridging structure 169 spanning pole pieces 170—171.

The bridging structure is in two parts, and comprises longitudinal side portions 172—173 of magnetic material, extending along the edges of the pole pieces; tongues 174—174 on the side portion 172, extending transversely therefrom toward the side portion 173, and like tongues 175—175 on the side portion 173 extending toward the side portion 172; the tongues being spaced at their ends from the side portions, and spaced apart longitudinally thereby providing a zig zag air gap.

The air gap is filled with a non-magnetic, hard setting bonding plastic material, by which the two parts of the bridging structure may be assembled together as a unit before mounting it on the pole pieces 170—171, as in Fig. 23 and mounting may be effected by screws 176.

Magnet flux in, say, the pole piece 170 flows to the side portion 172, and into tongues 174—174, thence across the ziz-zag air gap to the tongues 175—175, and to the side portion 173, and to the pole piece 171.

The top surface of the bridging structure is made planar, and any ferrous article placed on its plane will be gripped by flux flowing across some part or parts of the zig-zag air gap.

The magnets and the grip releasing mechanism have not been shown, but are implied by the end view Fig. 23, corresponding to Fig. 3; and identified by the mechanism operating handle 177 and the bar 178, and it is deemed unnecessary to further illustrate or describe this form in view of the foregoing.

I claim:

1. A magnetic holding device comprising a pair of elongated pole pieces having faces spaced apart, and having free edges in a common plane; a plurality of permanent magnets disposed in spaced apart relation in a longitudinal series between and engaged with the elongated pole piece faces to energize the said edges; a shaft of non-magnetic material extending along one side of the series of magnets and rotatably supported at its ends in slot-form bearings in non-magnetic elements carried by at least one of the pole pieces, and provided with a handle for manually rotating it; a plurality of ferrous bodies secured to the shaft to rotate therewith, and disposed in a spaced apart series along the shaft and between the pole pieces and a body spaced from the side of each of the magnets; a bar of magnetic material, means supporting it in engagement with one pole piece and having a longitudinal edge parallel to and adjacent to the other pole piece with a space therebetween; the bodies having peripheral portions eccentric to the shaft and disposed in said space without filling it, and by virtue of said slot form bearings and said eccentricity, becoming wedgingly engaged between the bar edge and the adjacent pole piece when rotated in one direction, to cause the bodies to complete closed magnetic paths between the pole pieces to short-circuit all of the magnets, and to introduce an air gap between the pole pieces when rotated in the opposite direction through a predetermined angle to destroy the short circuit magnetic paths.

2. A magnetic holding device comprising a pair of elongated rectangular planar ferrous plates, disposed with faces thereof parallel and spaced apart; a plurality of permanent magnets between the plates having opposite polar ends engaging the parallel faces of the plates; and the magnets provided with axially extending bores therethrough; the plates having free longitudinal side portions overlapping the sides of the magnets; and edges of the side portions disposed in a common plane; spacers of non-magnetic material between the plates at the ends thereof secured to at least one of the plates; and securing devices extending through the bores of the magnets, and secured to the plates; a shaft of non-magnetic material extending along one side of the series of magnets and rotatably supported at its ends in slot form bearings carried by the non-magnetic spacers and provided with a handle for manually rotating it; a plurality of ferrous bodies secured to the shaft to rotate therewith, and disposed in a spaced apart series along the shaft and between the plates, and a body spaced from the side of each of the magnets; an elongated bar of magnetic material mounted at its ends on the non-magnetic spacers, the bar having parallel edges, one edge being in contact with one of the plates and a space between the other edge and the other plate; the bodies having circular peripheral portions and mounted eccentrically on the shaft and disposed generally in said space without filling it, and the eccentricity of the bodies and the said slot form of the shaft bearings causing the bodies to come into wedging engagement between the said other edge of the bar and the plate spaced therefrom, when rotated in one direction, to cause the bodies to close magnetic paths between the pole plates through the bar and the bodies to short-circuit all of the magnets, and to introduce an air gap between the pole plates when rotated in the opposite direction through a predetermined angle to destroy the short circuit magnetic paths.

References Cited in the file of this patent

UNITED STATES PATENTS

| | | |
|---|---|---|
| 2,117,132 | Baermann | May 10, 1938 |
| 2,333,230 | Beechlyn | Nov. 2, 1943 |
| 2,492,238 | Roof | Dec. 27, 1949 |
| 2,572,514 | Phelon | Oct. 23, 1951 |